April 4, 1939.   R. E. CROWTHER   2,153,132
FOCUSING ARRANGEMENT FOR CAMERAS
Filed Feb. 20, 1937    2 Sheets-Sheet 1

Raymond E. Crowther
INVENTOR.
BY
ATTORNEYS

April 4, 1939.　　　R. E. CROWTHER　　　2,153,132
FOCUSING ARRANGEMENT FOR CAMERAS
Filed Feb. 20, 1937　　　2 Sheets-Sheet 2
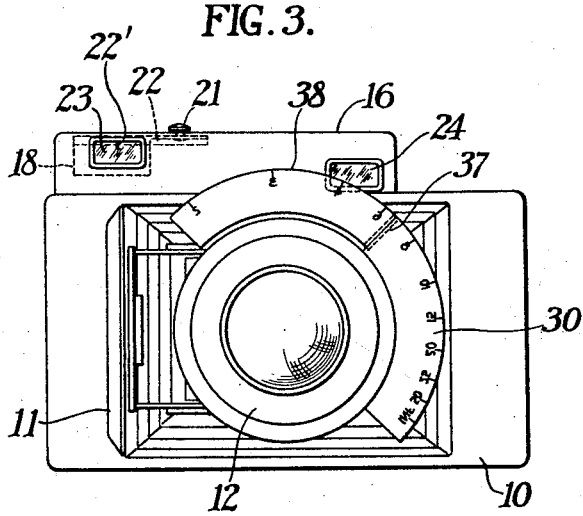
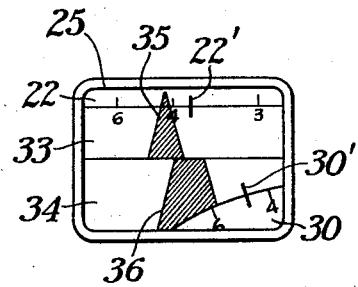
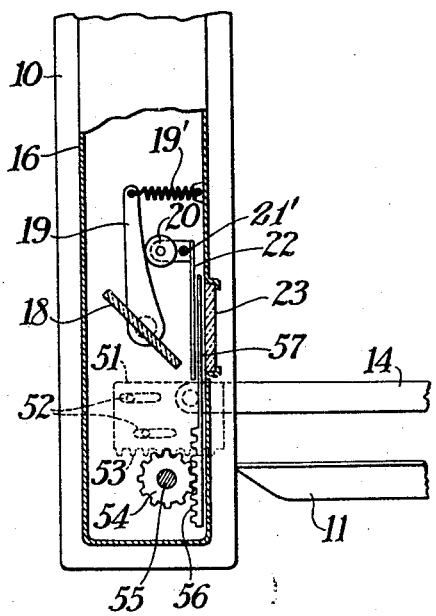
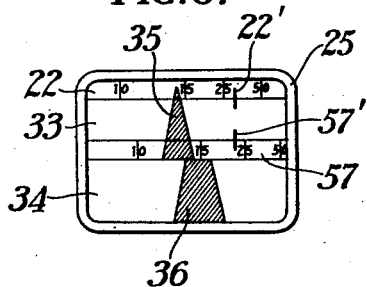
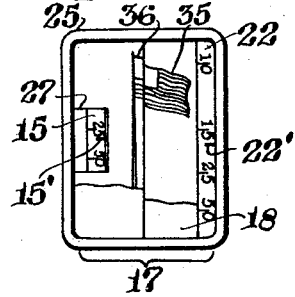
Raymond E. Crowther
INVENTOR.
BY
ATTORNEYS Patented Apr. 4, 1939

2,153,132

UNITED STATES PATENT OFFICE 2,153,132

FOCUSING ARRANGEMENT FOR CAMERAS

Raymond E. Crowther, London, England, assignor to Eastman Kodak Company, Rochester, N. Y., a corporation of New Jersey Application February 20, 1937, Serial No. 126,935
In Great Britain May 22, 1936

4 Claims. (Cl. 95—44)

This invention relates to devices for focusing a camera in accordance with the reading of a range finder mounted on the camera housing.

It is an object of the invention to provide a convenient means for adjusting the camera focus while taking a reading with the range finder, without removing the eye from the eye-piece of the range finder. The invention is particularly useful in connection with range finders of the split field type in which the field is approximately the same size as that which is being photographed (i. e. a combination range finder and view finder).

It is a particular object of the invention to provide means whereby the focusing scale mounted on the camera objective may be viewed through the eye-piece of the range finder whereby the focus may be adjusted until the scale reading thus viewed corresponds to the "coincidence" reading on the range finder scale which is viewed simultaneously.

Various embodiments of the invention are shown in the accompanying drawings in which:

Figure 3 is a front view of a camera which is provided with another form of the invention in which the focusing scale extends to one side of the camera objective, and may be viewed directly through the range finder eye-piece.

Figure 4 shows the field of view which appears in the eye-piece of the range finder shown in Figure 3.

Figure 5 is an elevation partially cut away of another form of the invention wherein the camera focusing means controls the position of an auxiliary scale which is mounted on the camera housing and which may be viewed through the range finder eye-piece simultaneously with the range finder scale.

Figure 6 shows the field of view as seen through the eye-piece of the range finder which is arranged as in Figure 5.

Figure 1:
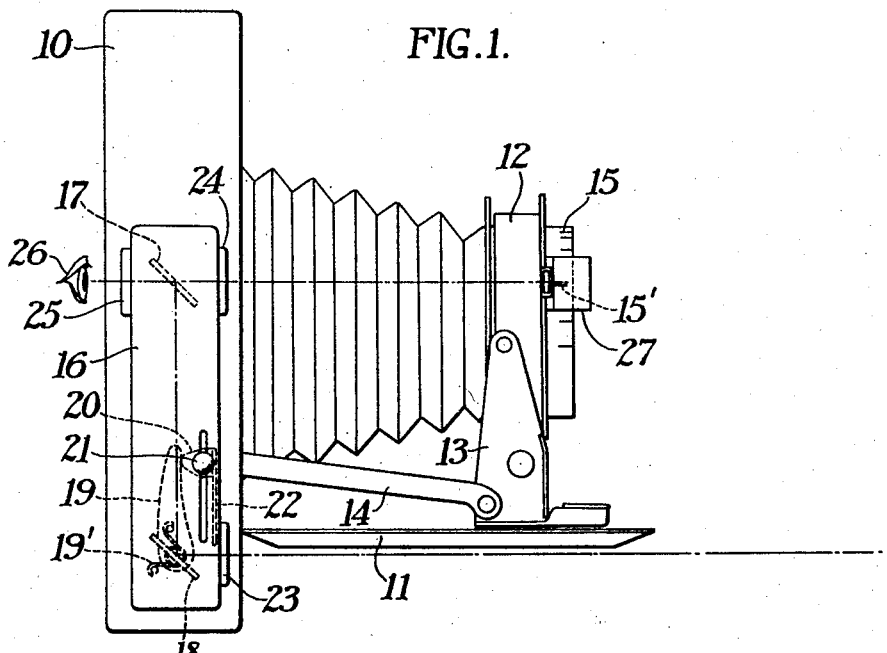
Figure 1 is a side elevation of one form of the invention wherein a mirror is mounted to one side of the camera objective whereby the focusing scale may be viewed through the range finder eye-piece.
Figure 2:
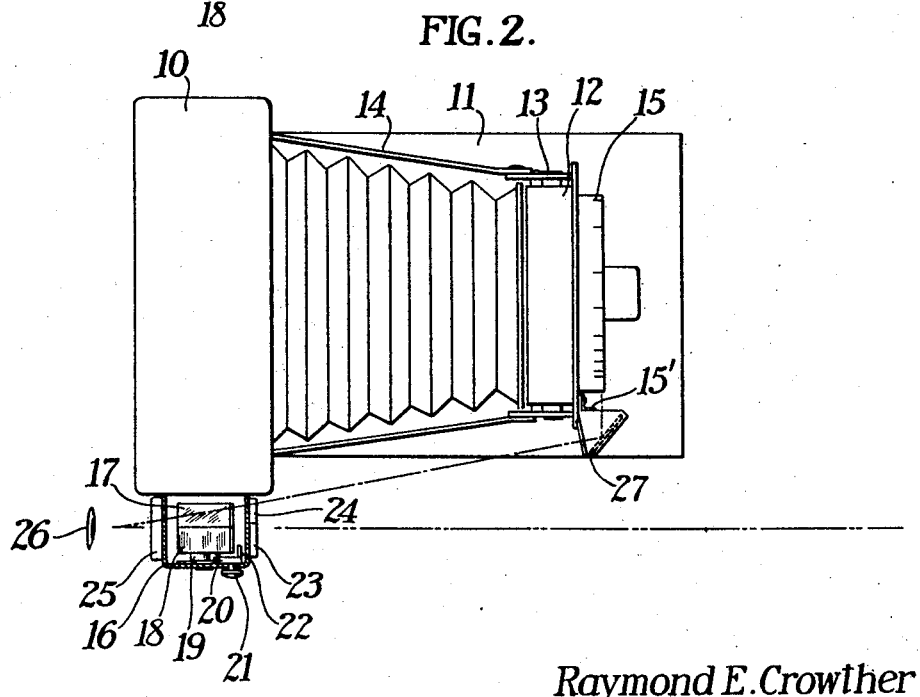
Figure 2 is a plan view of the arrangement shown in Figure 1.

Figure 7 similarly shows the field of view corresponding to Figures 1 and 2.

One form of the invention is shown in Figure 1 applied to a self erecting front camera having a housing 10 and a cover 11 which is also the camera bed. An objective mount 12 is mounted in the usual way by means of supports 13 on the camera bed 11. In the well-known manner the erecting member 14 brings the objective 12 into operative position when the camera is opened. The objective mount 12 is provided with a suitable scale 15 and index 15' for indicating the distance for which the camera is focused.

A range finder 16 is mounted on the side of the camera housing 10 and is of the usual type including a fixed semi-transparent mirror 17, a rotatable mirror 18 whose angular position is determined by a cam shaped lever 19, two windows 23 and 24 and an eye-piece 25. The position of the cam shaped lever 19 is determined by the position of a small lug 20 against which the lever 19 is urged as by a spring 19' and which projects through a slot in the range finder housing 16. A small button 21 rigidly attached to the lug 20 is positioned on the exterior of the range finder housing. The range finder is adjusted by pushing the button 21 laterally so that the lug 20 slides along the slot in the camera housing and moves the cam shaped lever 19 to rotate the mirror 18 to bring the two parts of the range finder field into coincidence in the usual well-known manner. The lug 20 carries a scale 22 which moves over a fixed index 22' (shown in Figure 7) and which may be viewed simultaneously with the part of the field seen through the window 23, in the eye-piece 25 of the range finder. As shown in the drawings the eye of the observer is placed at the point 26 and receives light from the subject (not shown) to be photographed, through both of the windows 23 and 24 of the range finder. A mirror 27 is arranged to bring the focusing scale 15 and index 15' into the field of view of the range finder.

As shown more clearly in Figure 2 the mirror 27 is positioned to allow the focusing scale to be easily viewed in the range finder eye-piece and to allow the camera to be closed conveniently. Similar reference numerals refer to similar details in all of the drawings. How these various parts appear when viewed by the observer's eye 26 is clearly shown in Figure 7.

A somewhat different arrangement of the invention, shown in Figure 3, eliminates the mirror 27 by providing a disk shaped focusing scale 30 extending to one side of the lens mount instead of or in addition to the focusing scale 15 not shown in this figure. The rulings on this scale 30 face toward the rear of the camera or preferably the scale 30 itself is made of transparent material. The index 30' for the scale is mounted between the scale 30 and the eye-piece 23 of the range finder preferably near the scale 30. For convenience in closing the camera, the scale 30 is made in two parts hinged on the line 37 so that an auxiliary section 38 which projects from the side of the camera objective may be folded over to lie on top of the other half of the scale 30 and thus does not interfere with closing the camera when the lens is focused in its infinity position.

When looking through the eye-piece 25 of the range finder 16, one sees a field of view similar to that shown in Figure 4 wherein the subject being photographed appears as shaded portions 35 and 36 which will come into coincidence when the range finder is adjusted in the well-known way. The images of the range finder scale 22 and its index 22', as reflected by the mirrors 18 and 17, appear as shown in a suitable position of the upper half 33 of the range finder field. Across a corner of the lower half 34 of the range finder field one sees the scale 30 and its index 30'. It will be understood that the two scales 22 and 30 may be caused to appear in any desired portions of the field of view.

In using a camera provided with the invention, the eye is placed near the eye-piece 25 and the range finder is adjusted by means of the button 21 until the two portions 35 and 36 of the camera subjects as viewed are brought into coincidence. The reading on the range finder scale 22 as indicated by the index 22' is then noted. The camera objective is then focused manually until the reading on the scale 30 as indicated by the index 30' is the same as that appearing on the range finder scale 22. When thus adjusted the camera is properly focused on the subject.

As is well-known, some cameras are made to focus by sliding forward a section of the camera bed carrying or comprising the objective mount. Many satisfactory arrangements for doing this are well-known in the art. In one such arrangement shown in Figure 5 the linear adjustment of the objective mount as a whole (rather than a rotational adjustment of the type described previously), is transmitted by the erecting member 14 to a sliding member 51 mounted in the camera housing and limited in its motion by pins and slots 52. This sliding member 51 carries a rack 53 which is in mesh with a pinion 54 which turns on an axle 55 and extends through the camera body 10 into the range finder housing 16. Another rack 56 which is also in mesh with the pinion 54 carries a scale 57 which is mounted near the range finder scale 22 and which is visible in the range finder eye-piece 25 not shown in this figure, by reflection from the mirrors 18 and 17 (the latter is not shown in this figure). The scale 22 may be adjusted in any suitable manual manner for example as in Figure 1, i. e., a stud 21' shown in cross section may extend through a slot in the range finder housing 16 and support an adjusting button similar to that shown as 21 in Figure 1.

With this arrangement the camera focus as indicated by the scale 57 and the range finder adjustment as indicated by the scale 22 are both visible in the same half 33 of the range finder field of view shown in Figure 6. The images of the range finder scale 22 and the focusing scale 57 have indexes 22' and 57' respectively.

The actual focusing adjustment may be accomplished by any suitable well-known means mounted on the camera bed 11, or the axle 55 may extend through the range finder housing 16 to a knob (not shown) which may be rotated manually, thereby moving the sliding member 51 and the erecting member 14.

It is to be understood that the invention is not limited to the specific structures shown but is of the scope of the appended claims.

What I claim and wish to protect by Letters Patent of the United States is:

1. A photographic camera having focusing means, a focusing scale for indicating the adjustment of the focusing means, a parallax type range finder mounted on the camera, a light deviating means therefor manually adjustable separately from the focusing means, a distance scale for indicating the range corresponding to the adjustment of the light deviating means, said distance scale being visible in the field of view of the range finder when sighted on a subject and optical means having substantially no effect on the range finder field of view secured to the camera for bringing into this field of view an image of said focusing scale.

2. A photographic camera having a lens, a lens mount, rotary means on the mount for focusing the lens, a focusing scale on the mount for indicating the adjustment of the focusing means, a parallax type range finder mounted on the camera and adjustable separately from the focusing means, a distance scale visible through the eyepiece of the range finder for indicating the adjustment thereof, and a reflector on the lens mount for forming a reflection image of the focusing scale within the field of view of said range finder.

3. A photographic camera having a lens, means for focusing the lens, a focusing scale for indicating the adjustment of the focusing means, a parallax type range finder mounted on the camera separate from the focusing means, a light deviating means in the range finder, means for adjusting the light deviating means separately from the focusing means, a distance scale visible in the eyepiece of the range finder for indicating the adjustment of the light deviating means, said focusing scale being positioned in the field of view of an observer taking a reading on said range finder so that the focusing scale and the distance scale may be compared.

4. In combination a camera having a lens and a focusing mechanism, a range finder secured to the camera, and having a movable element to adjust its setting, a scale in the field of view of the range finder carried by said movable element to indicate said setting, a second scale carried by said mechanism and extending laterally from the camera lens into the field of view of said range finder, whereby both scales may be viewed simultaneously with the range finder field.

RAYMOND E. CROWTHER.